United States Patent
Cho et al.

(10) Patent No.: US 9,560,342 B2
(45) Date of Patent: Jan. 31, 2017

(54) AUTOSTEREOSCOPIC MULTI-VIEW IMAGE DISPLAY APPARATUS

(71) Applicant: SAMSUNG ELECTRONICS CO., LTD., Suwon-si (KR)

(72) Inventors: Hyun-seung Cho, Anyang-si (KR); Ki-hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 197 days.

(21) Appl. No.: 14/339,655

(22) Filed: Jul. 24, 2014

(65) Prior Publication Data

US 2015/0245015 A1 Aug. 27, 2015

(30) Foreign Application Priority Data

Feb. 21, 2014 (KR) ........................ 10-2014-0020400

(51) Int. Cl.
| | |
|---|---|
| *H04N 7/12* | (2006.01) |
| *H04N 11/02* | (2006.01) |
| *H04N 11/04* | (2006.01) |
| *H04N 13/04* | (2006.01) |

(52) U.S. Cl.
CPC ........ *H04N 13/0404* (2013.01); *H04N 13/045* (2013.01); *H04N 13/0418* (2013.01); *H04N 13/0447* (2013.01)

(58) Field of Classification Search
None
See application file for complete search history.

(56) References Cited

U.S. PATENT DOCUMENTS

| | | | | |
|---|---|---|---|---|
| 2006/0066810 A1* | 3/2006 | Shestak | ................. | G03B 21/28 353/7 |
| 2009/0160826 A1* | 6/2009 | Miller | ................. | G09G 3/3291 345/204 |
| 2010/0118218 A1* | 5/2010 | Eichenlaub | ........ | G02B 27/2214 349/15 |
| 2010/0153395 A1* | 6/2010 | Hannuksela | ......... | G11B 27/102 707/737 |
| 2010/0165221 A1* | 7/2010 | Krijn | .................. | G02B 27/2214 349/15 |
| 2010/0245406 A1* | 9/2010 | Redert | ............... | H04N 13/0404 345/690 |
| 2010/0259819 A1* | 10/2010 | Hiddink | ............. | G02B 27/2242 359/463 |
| 2010/0328440 A1* | 12/2010 | Willemsen | ......... | G02B 27/2214 348/59 |

(Continued)

*Primary Examiner* — Frederick Bailey
*Assistant Examiner* — Talha M Nawaz
(74) *Attorney, Agent, or Firm* — Sughrue Mion, PLLC (57) ABSTRACT

An autostereoscopic multi-view image display apparatus includes an image panel including pixels arranged in rows and columns, a backlight unit configured to provide light to the image panel, and a viewing zone separator disposed in front of the image panel and configured to provide different viewpoints according to viewing zones. A processor is configured to control multi-view images included into one image frame to be divided into two groups, and to control two sub-frames including multi-view images included in the divided groups to be sequentially displayed. The lights of different directions are provided to the image panel at points of time when the two sub-frames are displayed, respectively.

8 Claims, 8 Drawing Sheets

(56) References Cited

U.S. PATENT DOCUMENTS

| | | | |
|---|---|---|---|
| 2011/0164036 A1* | 7/2011 | De Zwart | G02B 27/2214 345/419 |
| 2011/0248994 A1* | 10/2011 | Van Der Horst | H04N 13/0404 345/419 |
| 2013/0009945 A1* | 1/2013 | Davidson | G02B 26/0833 345/419 |
| 2013/0057159 A1* | 3/2013 | Pijlman | G02B 27/2214 315/154 |
| 2014/0002897 A1* | 1/2014 | Krijn | H04N 13/0404 359/463 |
| 2015/0042704 A1* | 2/2015 | Smith | H04N 13/0402 345/697 |
| 2016/0014398 A1* | 1/2016 | Kroon | G02B 27/225 348/59 |

\* cited by examiner

AUTOSTEREOSCOPIC MULTI-VIEW IMAGE DISPLAY APPARATUS

CROSS-REFERENCE TO RELATED APPLICATION

This application claims priority from Korean Patent Application No. 10-2014-0020400, filed on Feb. 21, 2014, in the Korean Intellectual Property Office, the disclosure of which is incorporated herein by reference in its entirety.

BACKGROUND

1. Field

Apparatuses and methods consistent with exemplary embodiments relate to an autostereoscopic multi-view image display apparatus, and more particularly, to an autostereoscopic multi-view image display apparatus which provides lights having different directions to an image panel.

2. Description of the Related Art

In recent years, three-dimensional (3D) display apparatuses, for example, televisions, capable of displaying a 3D image have been developed. The 3D display apparatuses may be divided into glasses type systems and glasses-free type systems according to whether or not glasses for viewing a 3D image are used.

A shutter glasses display apparatus is an example of the glasses type system which allows a user to experience a 3D effect by alternately outputting a left-eye image and a right-eye image, and simultaneously alternately opening and closing left and right shutter glasses of 3D glasses worn by the user in correspondence with the alternate output of the left-eye and right-eye images.

An autostereoscopic system is an example of the glasses-free type system. The autostereoscopic 3D display apparatus may allow the user to experience a 3D effect by projecting lights corresponding to images of different viewpoints to a left eye and a right eye of a viewer using parallax barrier technology or a lenticular lens while displaying spatially shifted multi-view images.

However, in order to improve image quality in the autostereoscopic 3D display apparatuses of the related art, the narrow viewing zone is formed which may result in reduced guidance of the viewer.

On the other hand, in some of the 3D display apparatuses of the related art, the viewing zone is increased to improve the guidance of the viewer. However, the increased viewing zone of the related art 3D display apparatuses may result in the reduced image quality.

Therefore, the related art cannot achieve simultaneous improvement in the image quality and the guidance of the viewer.

SUMMARY

One or more exemplary embodiments may overcome the above disadvantages and/or other disadvantages not described above. However, exemplary embodiments are not required to overcome the disadvantages described above, and may not overcome any of the problems described above.

One or more exemplary embodiments provide an autostereoscopic multi-view image display apparatus which increases a viewing zone and also prevents degradation of image quality.

According to an aspect of an exemplary embodiment, there is provided an autostereoscopic multi-view image display apparatus. The display apparatus may include: an image panel including a plurality of pixels arranged in rows and columns; a backlight unit configured to provide light to the image panel; a viewing zone separator disposed in front of the image panel and configured to provide different viewpoints according to viewing zones; and a controller configured to control multi-view images constituting one image frame to be divided into at least two groups, control at least two sub-frames including multi-view images included in the divided groups to be sequentially displayed, and control lights of different directions to be provided to the image panel at points of time when the at least two sub-frames are displayed, respectively.

The controller may control the backlight unit to provide light of a first direction with respect to the display apparatus to the image panel in a first sub-field period in which a first sub-frame is displayed, and to provide light of a second direction opposite to the first direction with respect to the display apparatus to the image panel in a second sub-field period in which a second sub-frame is displayed.

The controller may control one-half viewing zone of an entire viewing zone provided by the multi-view images constituting the one image frame to be provided in the first sub-field period, and the remaining one-half viewing zone to be provided in the second sub-field period.

The viewing zone separator may be a lenticular lens.

The backlight unit may be a directional backlight unit.

According to an aspect of an exemplary embodiment, there is provided an autostereoscopic multi-view image display apparatus. The display apparatus may include: an image panel including a plurality of pixels arranged in rows and columns; a backlight unit configured to provide light to the image panel; a viewing zone separator disposed in front of the image panel and configured to provide different viewpoints according to viewing zones; and a controller configured to control a first multi-view image frame corresponding to first content and a second multi-view image frame corresponding to second content to be sequentially displayed, and to control lights of different directions to be provided to the image panel at points of time when the first and second multi-view image frames are displayed, respectively.

The controller may control the backlight unit to provide light of a first direction with respect to the display apparatus to the image panel in a period in which the first multi-view image frame is displayed, and to provide light of a second direction opposite to the first direction with respect to the display apparatus to the image panel in a period in which the second multi-view image frame is displayed.

The controller may control multi-view images constituting at least one of the first and second multi-view image frames to be divided into at least two groups, control at least two sub-frames including multi-view images included in the divided groups to be sequentially displayed, and control lights of different directions to be provided to the image panel at points of time when the at least two sub-frames are displayed, respectively.

The viewing zone separator may be a lenticular lens.

The backlight unit may be a directional backlight unit.

According to various exemplary embodiments, degradation in image quality is prevented, and also guidance of the viewer may be increased by extending a viewing zone.

BRIEF DESCRIPTION OF THE DRAWINGS

The above and/or other aspects will become more apparent by describing in detail certain exemplary embodiments, with reference to the accompanying drawings, in which.

DETAILED DESCRIPTION

Certain exemplary embodiments will be described in more detail below with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. However, the exemplary embodiments can be carried out without those specifically defined matters. Also, functions or elements known in the related art are not described in detail since they would obscure the exemplary embodiments with unnecessary detail.

Figure 1:
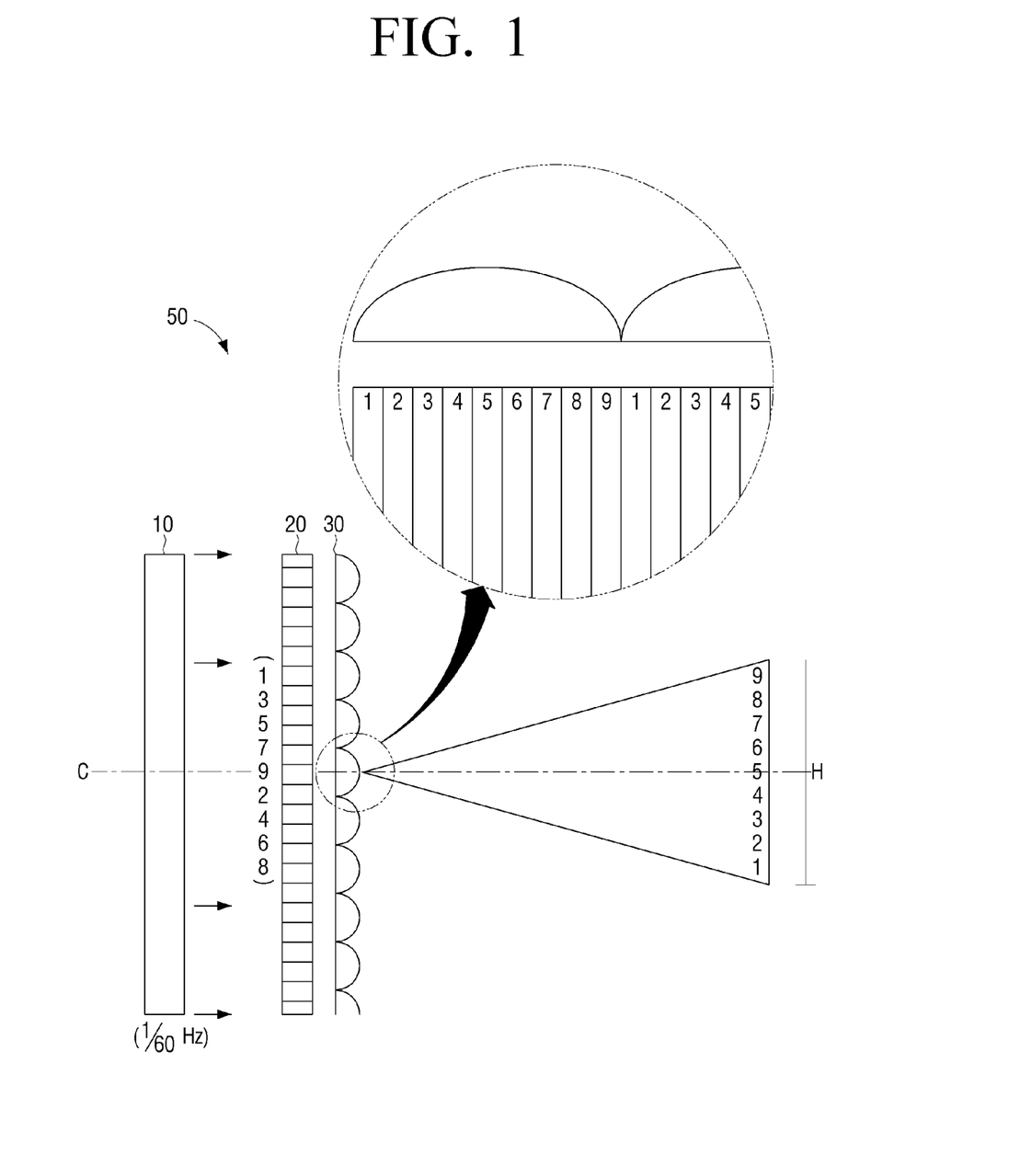
FIG. 1 is a view illustrating an autostereoscopic multi-view image display apparatus.

FIG. 1 is a view illustrating a configuration of an autostereoscopic 3D display apparatus 50. Referring to FIG. 1, the autostereoscopic 3D display apparatus 50 includes a backlight unit 10, an image panel 20, and a viewing zone separator 30.

The viewing zone separator 30 may include an opaque-shield slit array, i.e., as a parallax barrier, or a lenticular lens array. FIG. 1 illustrates an example of the lenticular lens array.

Referring to FIG. 1, the image panel 20 includes a plurality of pixels divided into a plurality of columns. Images having different viewpoints are arranged according to the respective columns. FIG. 1 illustrates a form in which a plurality of images 1, 2, 3, 4, 5, 6, 7, 8, and 9 having different viewpoints are sequentially repeatedly arranged. That is, each pixel column is arranged in groups numbered as 1, 2, 3, 4, 5, 6, 7, 8, and 9. A graphic signal applied to the image panel 20 is arranged so that a pixel column 1 displays a first image, and a pixel column 2 displays a second image.

The backlight unit 10 provides light to the image panel 20. Images 1, 2, 3, 4, 5, 6, 7, 8, and 9 formed in the image panel 20 are projected to the viewing zone separator 30 by the lights provided from the backlight unit 10, and the viewing zone separator 30 disperses the lights of the projected images 1 to 9 and transmits the lights toward the viewer. That is, the viewing zone separator 30 generates exit pupils to a location of the viewer, that is, a viewing zone. A thickness and diameter of a lenticular lens of a lenticular lens array may be designed so that the exit pupils generated by the columns are separated by an average center distance of both eyes of less than about 65 mm. The separated image lights forms viewing zones, respectively. That is, as illustrated in FIG. 1, since viewing zones 1 to 9 are formed, the user may experience a 3D effect without special glasses.

Figure 2:
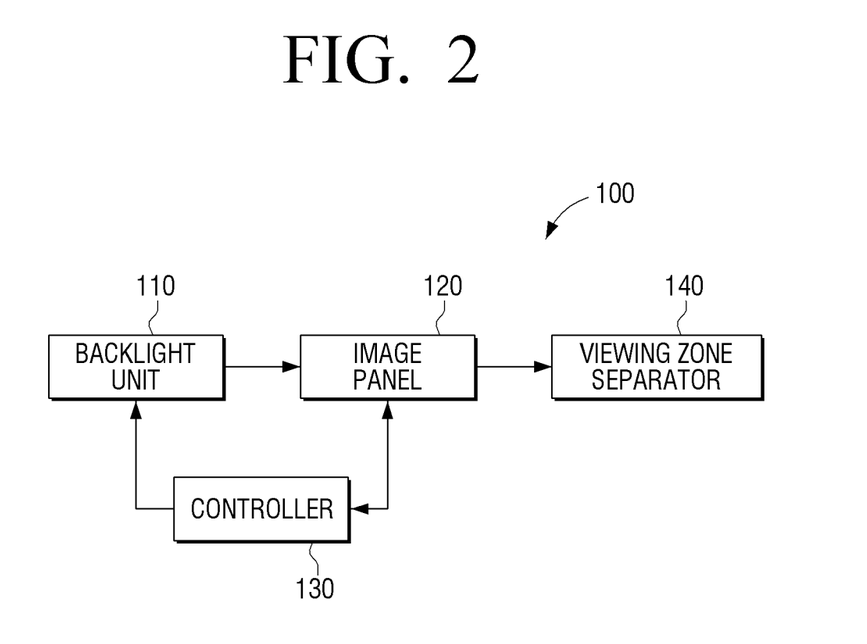
FIG. 2 is a block diagram illustrating an example of a display apparatus according to an exemplary embodiment.

FIG. 2 is a block diagram illustrating an example of a display apparatus 100 according to an exemplary embodiment.

Referring to FIG. 2, the display apparatus 100 according to an exemplary embodiment includes a backlight unit 110, an image panel 120, a controller 130, and a viewing zone separator 140.

The backlight unit 110 provides light toward the image panel 120. In particular, the backlight unit 110 may be switched between a plurality of different sub-fields according to control of the controller 130 to selectively provide the light to the image panel 120. That is, the backlight unit 110 may be switched between the sub-fields in synchronization with an image display cycle of the image panel 120.

The backlight unit 110 may be a directional backlight unit 110. A structure, operation, and the like of the directional backlight unit are known to those skilled in the art, and thus detailed description thereof will be omitted.

The image panel 120 includes a plurality of pixels arranged in rows and columns. The image panel 120 may be a transmissive image panel 120 which needs a separate light source such as the backlight unit 110. For example, the image panel 120 may include a liquid crystal display (LCD) panel. Further, each pixel of the image panel 120 may include a LC cell.

The image panel 120 may alternately display a plurality of images of which viewpoints are slightly different one by one according to control of the controller 130.

The image panel 120 may be a panel including a color filter or a panel which operates in a field sequential color (FSC) driving method, for example, a field sequential method, a color sequential driving method, or the like. The FSC driving method is a method which temporally divides R, G, and B lights and sequentially projects the divided lights without use of a color field.

The viewing zone separator 140 is disposed in front of the image panel 120, and provides different viewpoints according to viewing zones. That is, the viewing zone separator 140 disperses light emitted from the image panel 120 according to the viewing zones. Thus, lights corresponding to images having different viewpoints are emitted according to the viewing zones.

The viewing zone separator 140 may be implemented with a lenticular lens. The viewing zone separator 140 implemented with the lenticular lens includes a plurality of lens regions. Each lens region is formed in a size corresponding to at least one pixel column, and differently disperses lights, which transmit pixels of each pixel column, according to the viewing regions. Each lens region may include a circular lens. Pitches and curvature radii of each lens may be differently designed according to the number of images at each viewpoint and a viewing distance.

The viewing zone separator 140 is arranged to match a column direction of the respective pixels included in the image panel 120.

The controller 130 performs a control to operations of the backlight unit 110 and image panel 120.

According to an exemplary embodiment, the controller 130 may divide multi-view images included into one image frame into at least two groups. For example, the controller 130 may divide the multi-view images included into the one image frame into a first sub-frame and a second sub-frame.

Then, the controller 130 may control the image panel 120 to sequentially display at least two sub-frames including multi-view images included in the divided groups. In the above-described exemplary embodiment, the controller 130 may control the image panel 120 to provide one-half viewing zone of an entire viewing zone provided by the multi-view images included into the one image frame in a first sub-field period in which the first sub-frame is displayed. The controller 130 may control the image panel 120 to provide the remaining one-half viewing zone of the entire viewing zone provided by the multi-view image included into the one image frame other than the viewing zone provided in the first sub-field period in a second sub-field period in which the second sub-frame is displayed.

Then, the controller 130 may control the backlight unit 110 to provide lights of different directions to the image panel 120 at points of time when the two sub-frames are displayed, respectively. In the above-described exemplary embodiment, the controller 130 may control the backlight unit 110 to provide light of a first direction with respect to the display apparatus 100 to the image panel 120 in the first sub-field period in which the first sub-frame is displayed. The controller 130 may control the backlight unit 110 to provide light of a second direction opposite to the first direction with respect to the display apparatus 100 to the image panel 120 in the second sub-field period in which the second sub-frame is displayed.

A specific operation of the controller 130 according to an exemplary embodiment will be described with reference to FIGS. 3 to 5.

According to another exemplary embodiment, the controller 130 may divide multi-view images included into at least one of first and second multi-view image frames into at least two groups. For example, the controller 130 may divide two image frames corresponding to different content images into two groups, that is, the first multi-view image frame and the second multi-view image frame.

Then, the controller 130 may control the image panel 120 to sequentially display at least two sub-frames including multi-view images included in the divided groups. In the above-described exemplary embodiment, the controller 130 may control the image panel 120 to display the first multi-view image frame corresponding to first content, and then to display the second multi-view image frame corresponding to second content.

Next, the controller 130 may control lights of different directions to be provided to the image panel 120 at points of time when the two sub-frames are displayed. In the above-described exemplary embodiment, the controller 130 may control the backlight unit 110 to provide light of a first direction to the image panel 120 at a point of time when the first multi-view image frame is displayed, and control the backlight unit 110 to provide light of a second direction to the image panel in a point of time when the second multi-view image frame is displayed. The first direction and the second direction may be different directions.

That is, the controller 130 may control the backlight unit 110 to provide the light of the first direction with respect to the display apparatus 100 to the image panel 120 in a period in which the first multi-view image frame is displayed. The controller 130 may control the backlight unit 110 to provide the light of the second direction which is an opposite direction to the first direction with respect to the display apparatus 100 to the image panel 120 in a period in which the second multi-view image frame is displayed.

A specific operation of the controller 130 according to another exemplary embodiment will be described with reference to FIGS. 6 to 8.

Figure 3:
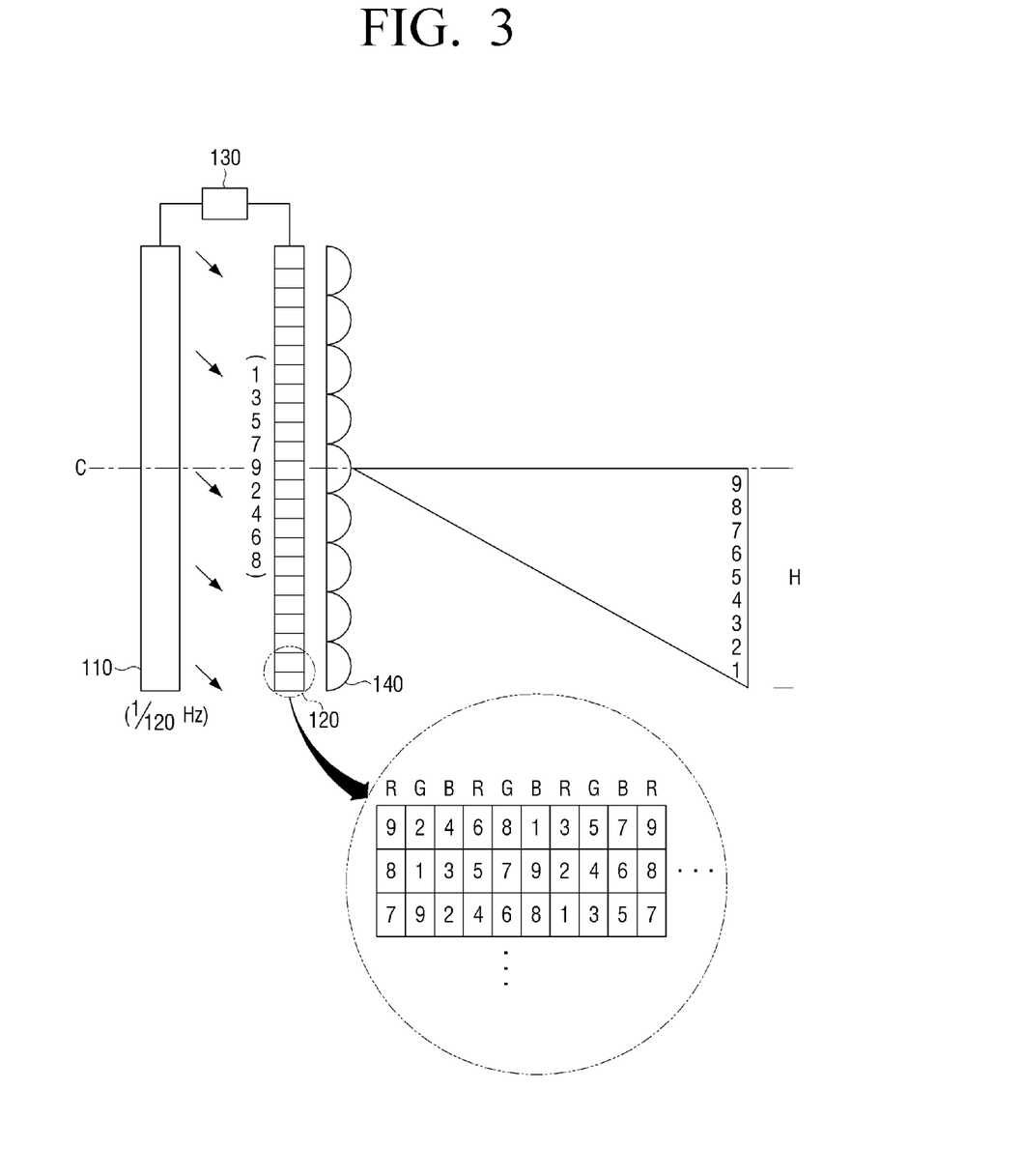
FIGS. 3, 4, and 5 are views explaining an operation of a display apparatus according to an exemplary embodiment.
Figure 4:
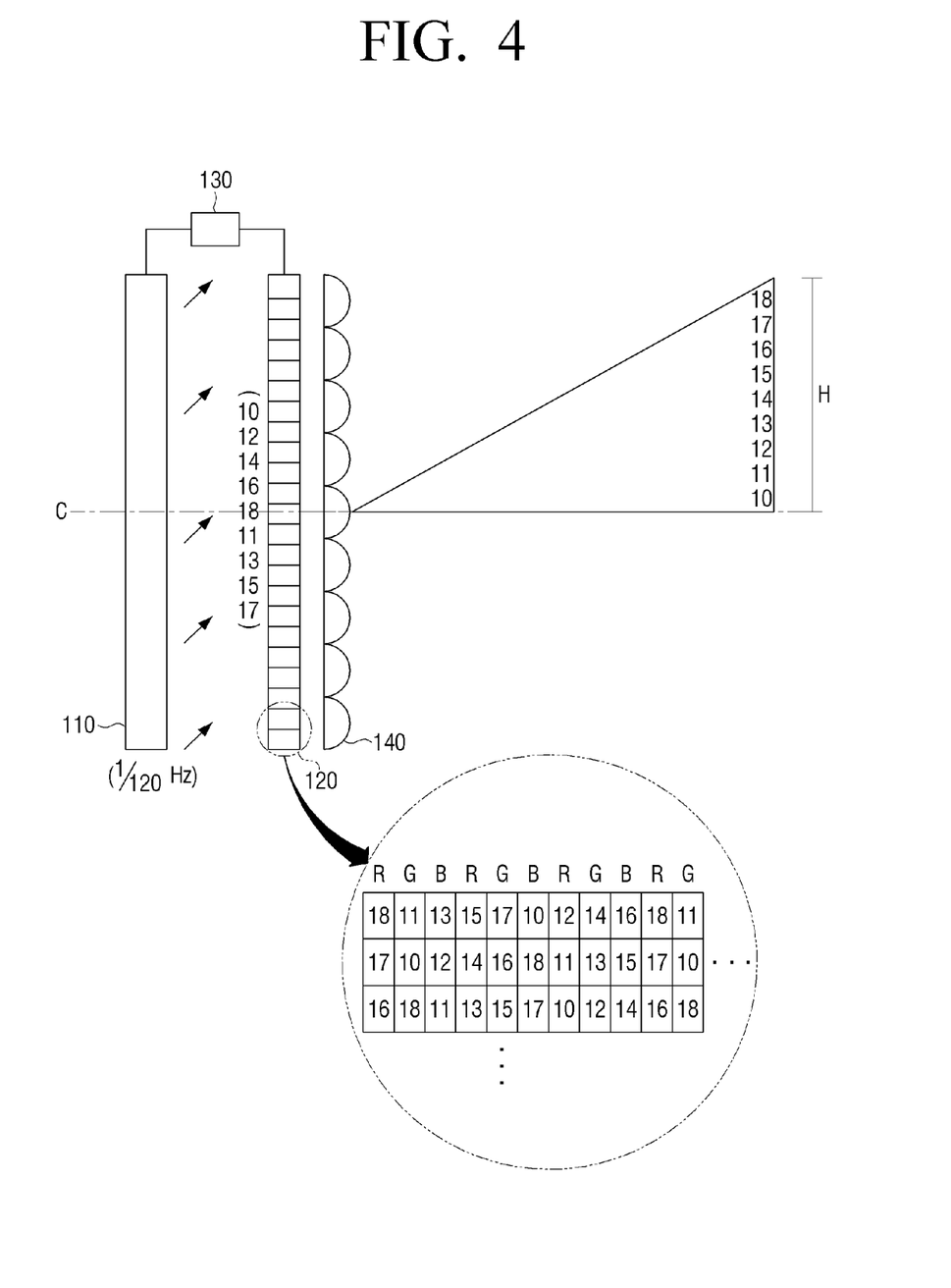
Figure 5:
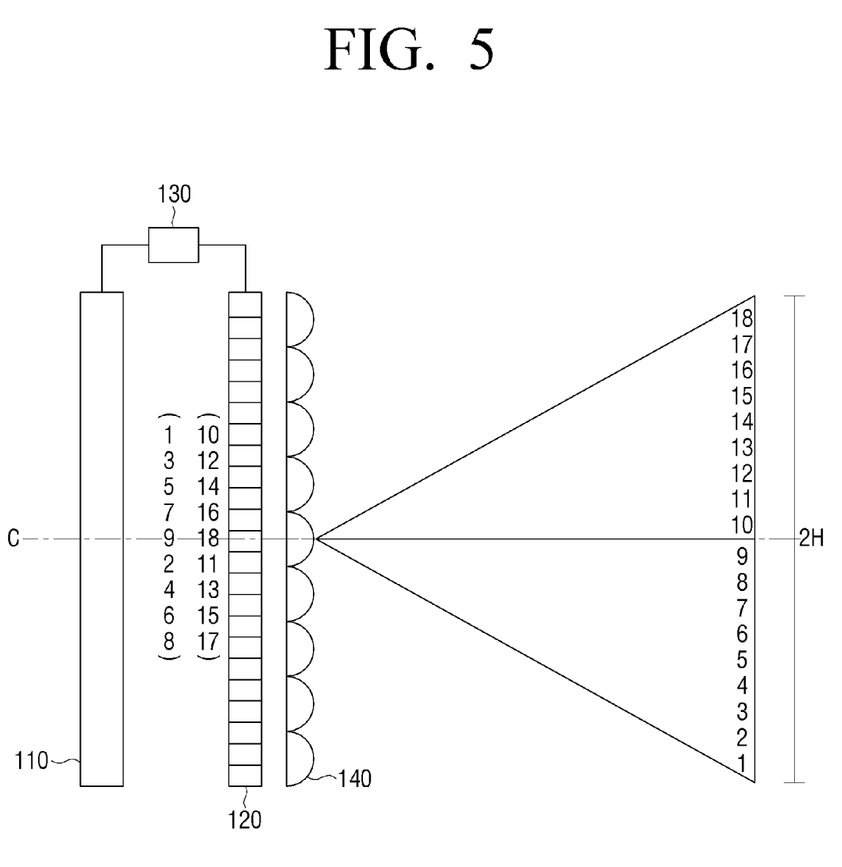

FIGS. 3 to 5 are views explaining an operation of the display apparatus 100 according to an exemplary embodiment. In FIGS. 3 to 5, an example of multi-view images included into one image frame which are configured of a first view to an eighteenth view is described, but the inventive concept is not limited thereto.

Referring to FIG. 3, the image panel 120 displays the first sub-frame corresponding to a first group among the multi-view images included into the one image frame under control of the controller 130. The first sub-frame may include the first view to the ninth view of the one image frame including the first view to the eighteenth view. That is, the first sub-frame may be a sub-frame corresponding to one-half viewing zone of the entire viewing zone provided by the multi-view images included into the one image frame.

The backlight unit 110 provides light of a first direction to the image panel 120 at a point of time when a first sub-frame is displayed under control of the controller 130. As illustrated in FIG. 3, the first direction may be a direction corresponding to a right direction with respect to the display apparatus 100.

Therefore, the viewing zone separator 140 displays multi-view images included into the first sub-frame in a first region. As illustrated in FIG. 3, the first region in which the multi-view images included into the first sub-frame are displayed may be a region corresponding to a right region with respect to the center axis C of the display apparatus 100, for example, a right eye view region.

Referring to FIG. 4, the image panel 120 displays the second sub-frame of the multi-view images included into the one image frame corresponding to a second group under control of the controller 130. The second sub-frames may include the remaining tenth view to eighteenth view of the one image frame including the first view to the eighteenth view other than the first view to the ninth view. That is, the second sub-frame may be a sub-frame corresponding to the remaining one-half viewing zone of the entire viewing zone provided by the multi-view images included into the one image frame other than the viewing zone provided in the first sub-field frame.

The backlight unit 110 provides light of a second direction to the image panel 120 at a point of time when the second sub-frame is displayed under control of the controller 130. As illustrated in FIG. 4, the second direction may be a direction corresponding to a left direction with respect to the display apparatus 100.

Therefore, the viewing zone separator 140 displays the multi-view images included into the second sub-frame in a second region. As illustrated in FIG. 4, the second region in which the multi-view images included into the second sub-frame may be a region corresponding to a left region with respect to the center axis C of the display apparatus 100, for example, a left eye view region.

Since the first sub-frame and the second sub-frame constitute one image frame, the one image frame is displayed as illustrated in FIG. 5. That is, referring to FIG. 5, the multi-view images included into the first sub-frame are displayed in the first region which is the right region with respect to the center axis C of the display apparatus 100, and the multi-view images included into the second sub-frame are displayed in the second region which is the left region with respect to the center axis C of the display apparatus 100.

According to the display apparatus 100 according to an exemplary embodiment, the degradation in image quality may be prevented, and also the viewing zone of the viewer is widened. That is, the viewing zone of the display according to FIG. 1 is H, but the viewing zone of the display according to an exemplary embodiment is 2H as illustrated in FIG. 5, and thus it can be seen that the viewing zone is extended.

Figure 6:
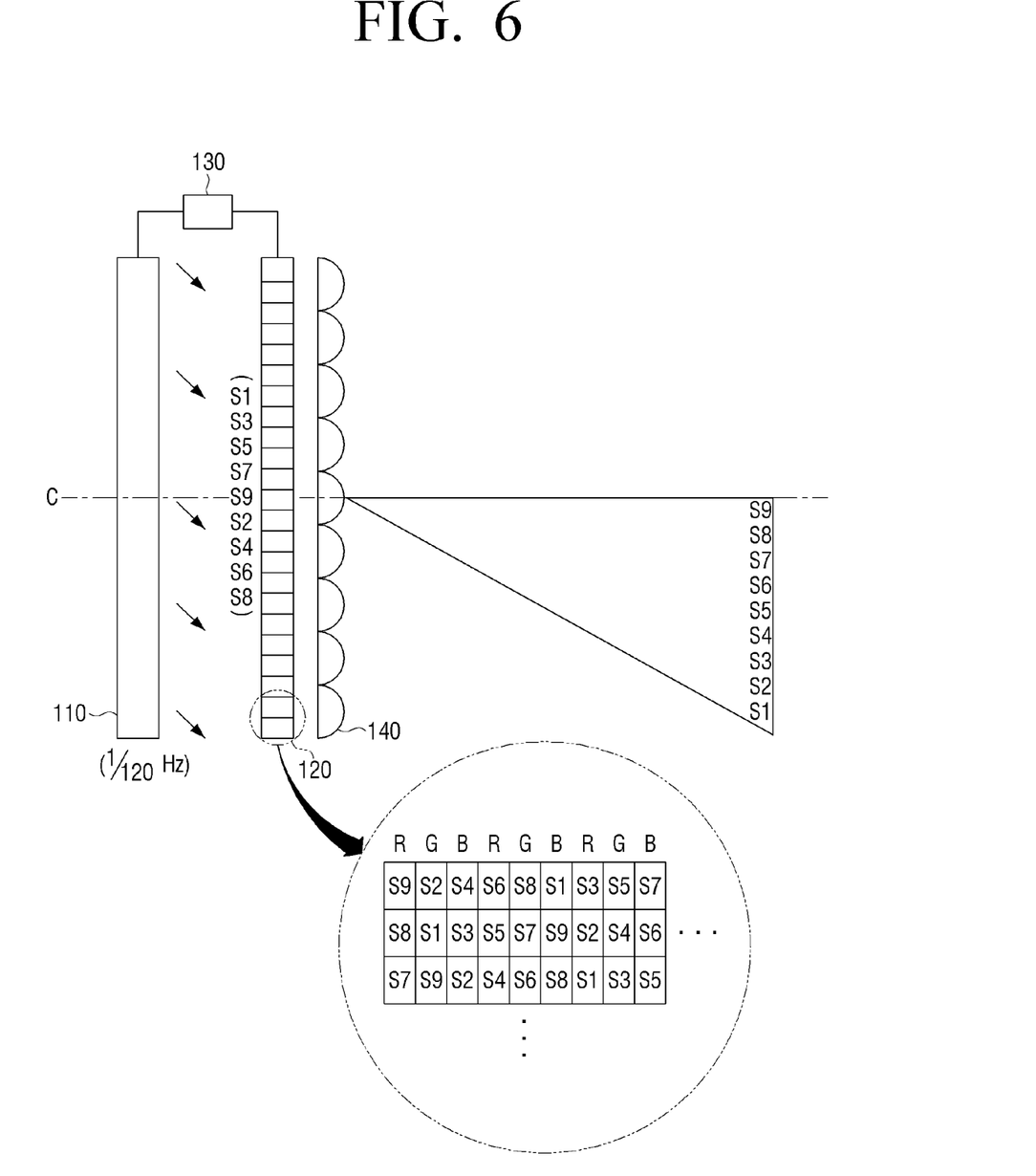
FIGS. 6, 7, and 8 are views explaining an operation of a display apparatus according to an exemplary embodiment.
Figure 7:
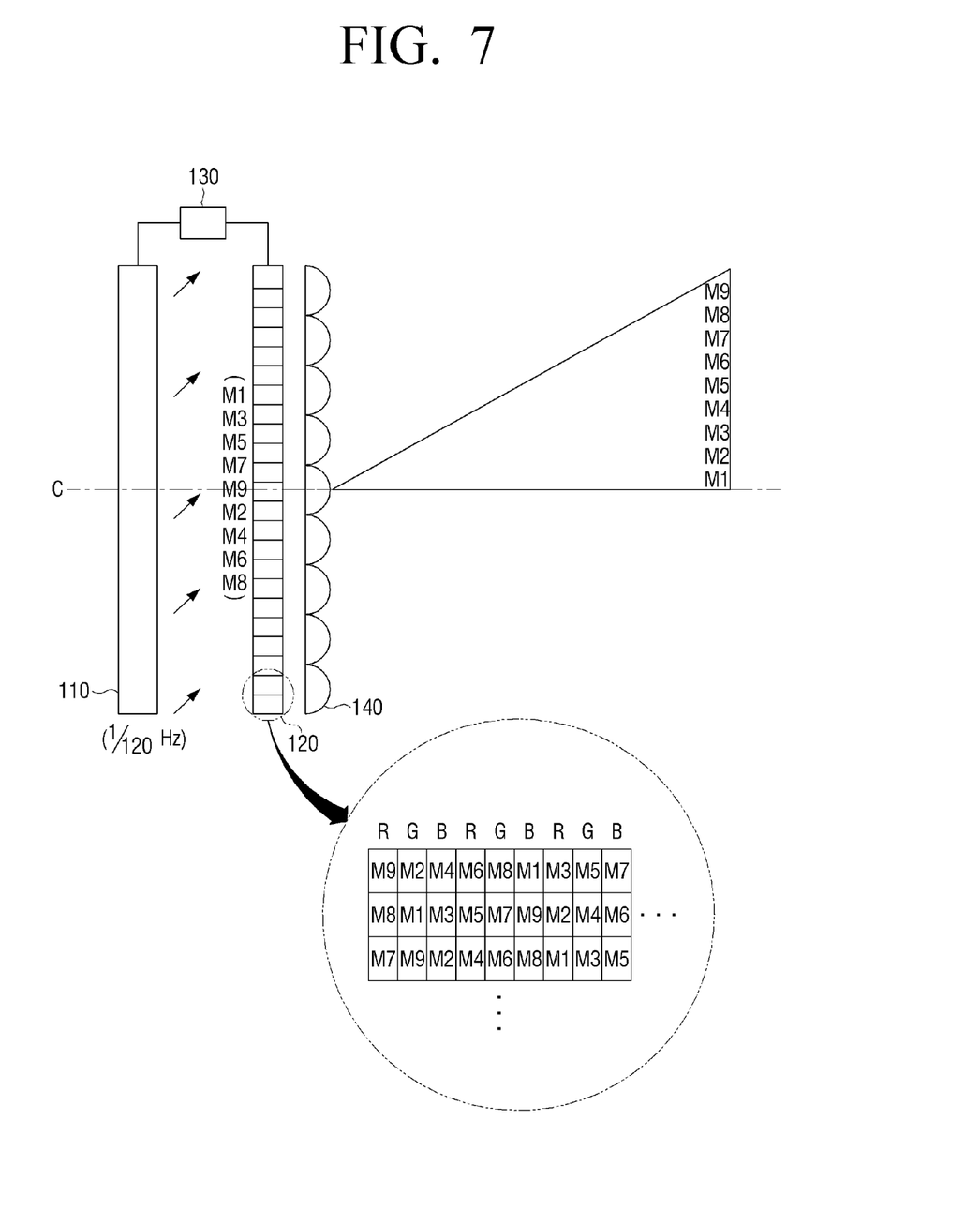
Figure 8:
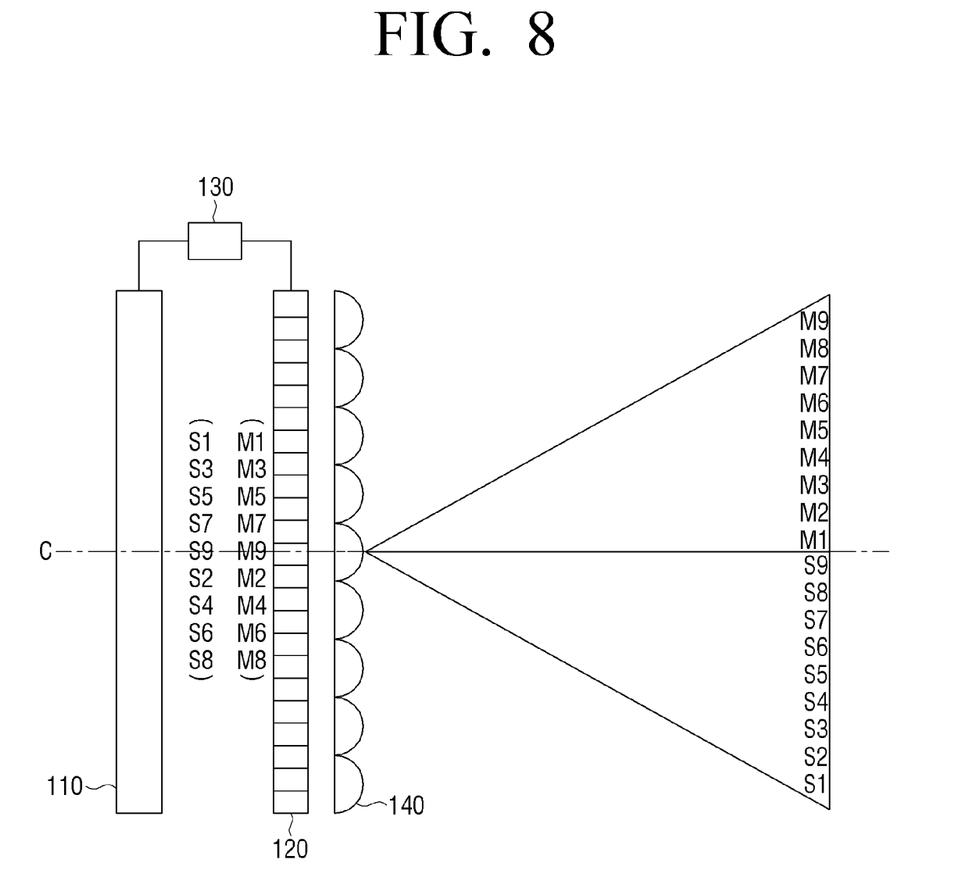

FIGS. 6 to 8 are views explaining an operation of a display apparatus 100 according to another exemplary embodiment. In FIGS. 6 to 8, an example of multi-view images included into one image frame which are configured of the first view to the ninth view is described, but the inventive concept is not limited thereto.

The controller 130 divides two image frames corresponding to different content images into two groups, that is, a first multi-view image frame and a second multi-view image frame. The first multi-view image frame may include an S1 view to an S9 view, and the second multi-view image may include an M1 view to an M9 view.

Referring to FIG. 6, the image panel 120 displays the first multi-view image frame corresponding to a first content image among a plurality of content images under control of the controller 130. The first multi-view image frame may include the S1 view to the S9 view. That is, the first multi-view image frame may be an entire viewing zone provided by multi-view images included into one image frame.

The backlight unit 110 provides light of a first direction to the image panel 120 at a point of view when the first multi-view image frame is displayed under control of the controller 130. As illustrated in FIG. 6, the first direction may be a direction corresponding to a right direction with respect to the display apparatus 100.

Accordingly, the viewing zone separator 140 displays multi-view images included into the first multi-view image frame in a first region. As illustrated in FIG. 6, the first region in which the multi-view images included into the first multi-view image frame are displayed may be a region corresponding to a right region with respect to a center axis C of the display apparatus 100.

Referring to FIG. 7, the image panel 120 displays the second multi-view image frame corresponding to the second content image among the plurality of content images under control of the controller 130. The second multi-view image frame may include the M1 view to the M9 view. That is, the second multi-view image frame may be an entire viewing zone provided by the multi-view images included into the one image frame.

The backlight unit 110 provides light of a second direction at a point of view when the second multi-view image frame is displayed under control of the controller 130. As illustrated in FIG. 7, the second direction may be a direction corresponding to a left direction with respect to the display apparatus 100.

Therefore, the viewing zone separator 140 displays multi-view images included into the second multi-view image frame in a second region. As illustrated in FIG. 7, the second region which the multi-view images included into the second multi-view image frame are displayed may be a left region on the center axis C of the display apparatus 100.

The first multi-view image frame and the second multi-view image frame constitute the first content image and the second content image, and thus the plurality of image frames are displayed as illustrated in FIG. 8. That is, referring to FIG. 8, the multi-view images included into the first multi-view image frame are displayed in the first region which is the right region with respect to the center axis C of the display apparatus 100, and the multi-view images included into the second multi-view image frames are displayed in the second region which is the left region with respect to the center axis C of the display apparatus 100.

Hereinafter, a control method of the display apparatus 100 according to an exemplary embodiment will be described. Hereinafter, detailed description for an overlapping portion with the above description will be omitted.

First, the display apparatus 100 divides multi-view images included into one image frame into at least two groups. For example, the display apparatus 100 may divide the multi-view images included into the one image frame into a first sub-frame and a second sub-frame.

Then, the display apparatus 100 sequentially displays at least two sub-frames including multi-view images included in the divided groups. For example, the display apparatus 100 may provide one-half viewing zone of an entire viewing zone provided by the multi-view images included into the one image frame in a first sub-field period in which the first sub-frame is displayed. The display apparatus 100 may provide the remaining one-half viewing zone of the entire viewing zone provided by the multi-view images included into the one image frame in a second sub-field period in which the second sub-frame is displayed other than the viewing zone provided in the first sub-field period.

Then, the display apparatus 100 may provide lights of different directions at points of time when the two sub-frames are displayed, respectively. For example, the display apparatus 100 may provide light of a first direction with respect to the display apparatus 100 in the first sub-field period in which the first sub-frame is displayed. The display apparatus 100 may provide light of a second direction opposite to the first direction with respect to the display apparatus 100 in the second sub-field period in which the second sub-frame is displayed.

Hereinafter, a control method of the display apparatus 100 according to another exemplary embodiment will be described. Hereinafter, description of an overlapping portion with the above description will be omitted.

First, the display apparatus 100 divides multi-view images included into at least one of first and second multi-view image frames into at least two groups. For example, the display apparatus 100 may divide two image frames corresponding to different content images into a first multi-view image frame and a second multi-view image frame.

Next, the display apparatus 100 sequentially displays at least two sub-frames including multi-view images included in the divided groups. For example, the display apparatus 100 may display the first multi-view image frame corresponding to first content, and then display the second multi-view image frame corresponding to second content.

Next, the display apparatus 100 may provide lights of different directions at points of time when the two sub-frames are displayed, respectively. For example, the display apparatus 100 may provide light of a first direction with respect to the display apparatus 100 at a point of time when the first multi-view image frame is displayed. The display apparatus 100 may provide light of a second direction opposite to the first direction with respect to the display apparatus 100 at a point of time when the second multi-view image frame is displayed.

The control method of a display apparatus according to the above-described exemplary embodiments may be stored in a non-transitory readable recording medium. The non-transitory readable recording medium may be installed in various apparatuses and used.

For example, a program code for performing a control method of a display apparatus including dividing multi-view images included into one image frame into at least two groups, sequentially displaying at least two sub-frames including multi-view images included in the divided groups, and providing lights of different directions at points of time when the two sub-frames are displayed, respectively, may be stored in the non-transitory readable medium and provided.

The non-transitory readable medium is not a medium configured to temporarily store data such as a register, a cache, or a memory but an apparatus-readable medium configured to semi-permanently store data. Specifically, the non-transitory apparatus-readable medium may include a compact disc (CD), a digital versatile disc (DVD), a hard disc, a Blu-ray disc, a universal serial bus (USB), a memory card, or a read only memory (ROM).

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. An autostereoscopic multi-view image display apparatus comprising:
   an image panel including pixels arranged in rows and columns;
   a backlight unit configured to provide light to the image panel;
   a viewing zone separator disposed in front of the image panel and configured to provide different viewpoints according to viewing zones; and
   a processor configured to divide multi-view images constituting one image frame into two groups, control a sequential display of two sub-frames including multi-view images included in respective divided groups on the image panel, and control the backlight unit to provide lights of different directions to the image panel in response to the two sub-frames being displayed, respectively,
   wherein the two sub-frames comprise a first sub-frame and a second sub-frame, and
   the processor is further configured to control the backlight unit to provide light of a first direction, with respect to the display apparatus, to the image panel in a first sub-field period, in which the first sub-frame is displayed, and to provide light of a second direction opposite to the first direction to the image panel in a second sub-field period, in which the second sub-frame is displayed.

2. The display apparatus as claimed in claim 1, wherein the processor is further configured to control a one-half viewing zone of an entire viewing zone provided by the multi-view images of the one image frame to be provided in a first sub-field period, and a remaining one-half viewing zone of the entire viewing zone to be provided in a second sub-field period.

3. The display apparatus as claimed in claim 1, wherein the viewing zone separator comprises a lenticular lens.

4. The display apparatus as claimed in claim 1, wherein the backlight unit comprises a directional backlight unit.

5. The display apparatus as claimed in claim 1, wherein the backlight unit, the image panel, and the viewing zone separator are arranged in this order, and
   the processor is configured to control the backlight unit to emit the lights of the different directions to the image panel when each of the two sub-frames is displayed, respectively.

6. An autostereoscopic multi-view image display apparatus comprising:
   an image panel including pixels arranged in rows and columns;
   a backlight unit configured to provide light to the image panel;
   a viewing zone separator disposed in front of the image panel and configured to provide different viewpoints according to viewing zones; and
   a processor configured to control a first multi-view image frame corresponding to a first content and a second multi-view image frame corresponding to a second content to be sequentially displayed, and to control the backlight unit to provide lights of different directions to the image panel in response to the first and second multi-view image frames being displayed, respectively,
   wherein the processor is further configured to divide multi-view images included into the first and second multi-view image frames into two groups, control a sequential display of first and second sub-frames including the multi-view images included in the divided groups on the image panel, and to control the backlight unit to provide light of a first direction, with respect to the display apparatus, to the image panel in response to the first sub-frame being displayed, and to provide light of a second direction opposite to the first direction to the image panel in response to the second sub-frame being displayed.

7. The display apparatus as claimed in claim 6, wherein the viewing zone separator comprises a lenticular lens.

8. The display apparatus as claimed in claim 6, wherein the backlight unit comprises a directional backlight unit.

* * * * *